United States Patent [19]

Howells

[11] Patent Number: 4,566,981

[45] Date of Patent: Jan. 28, 1986

[54] FLUOROCHEMICALS AND FIBROUS SUBSTRATES TREATED THEREWITH: COMPOSITIONS OF CATIONIC AND NON-IONIC FLUOROCHEMICALS

[75] Inventor: Richard D. Howells, St. Paul, Minn.

[73] Assignee: Minnesota Mining and Manufacturing Company, St. Paul, Minn.

[21] Appl. No.: 595,349

[22] Filed: Mar. 30, 1984

[51] Int. Cl.$^4$ .............................................. C08F 12/20
[52] U.S. Cl. .................................... 252/8.8; 252/8.6; 524/225; 526/242; 526/245; 526/248
[58] Field of Search .................................. 252/8.8, 8.6

[56] References Cited

U.S. PATENT DOCUMENTS

| | | | |
|---|---|---|---|
| 3,329,661 | 7/1967 | Smith et al. | 260/79.3 |
| 3,398,182 | 8/1968 | Guenthner et al. | 260/455 |
| 3,458,571 | 7/1969 | Tokoli | 260/556 |
| 3,462,296 | 8/1969 | Raynolds et al. | 117/161 |
| 3,574,791 | 4/1971 | Sherman et al. | 260/884 |
| 3,728,151 | 4/1973 | Sherman et al. | 117/138.8 |
| 3,896,251 | 7/1975 | Landucci | 428/290 |
| 3,916,053 | 10/1975 | Sherman et al. | 428/96 |
| 4,013,627 | 3/1977 | Temple | 526/245 |
| 4,024,178 | 5/1977 | Landucci | 260/472 |
| 4,029,585 | 6/1977 | Dettre et al. | 252/8.6 |
| 4,144,367 | 3/1979 | Landucci | 428/96 |
| 4,165,338 | 8/1979 | Katsushima et al. | 260/584 |
| 4,190,545 | 2/1980 | Marshall et al. | 252/8.75 |
| 4,215,205 | 7/1980 | Landucci | 525/331 |
| 4,264,484 | 4/1981 | Patel | 260/29.6 |
| 4,325,857 | 4/1982 | Champaneria et al. | 523/412 |
| 4,401,780 | 8/1983 | Steel | 524/225 |
| 4,426,476 | 1/1984 | Chang | 524/288 |

OTHER PUBLICATIONS

Banks, R. E., Ed., "Organofluorine Chemicals and their Industrial Applications", Ellis Horwood, Ltd., West Sussex, England, 226–230, (1979).

*Primary Examiner*—A. Lionel Clingman
*Attorney, Agent, or Firm*—Donald M. Sell; James A. Smith; Carole Truesdale

[57] ABSTRACT

Cationic and non-ionic fluorochemicals, mixtures of cationic and non-ionic fluorochemicals, blends of the mixtures with fluorochemical poly(oxyalkylenes), and compositions of the fluorochemicals with hydrocarbon nonionic surfactants are provided. These fluorochemicals and compositions, in dispersions, emulsions and microemulsions, may be applied to porous fibrous substrates to give oil and water repellancy and soil resistance.

15 Claims, No Drawings

FLUOROCHEMICALS AND FIBROUS SUBSTRATES TREATED THEREWITH: COMPOSITIONS OF CATIONIC AND NON-IONIC FLUOROCHEMICALS

TECHNICAL FIELD

This invention relates to the treatment of porous fibrous substrates, such as textile fibers, carpet, paper, and leather, with fluorochemical compositions to impart oil and water repellency, and to the resulting treated substrates. In another aspect, it relates to the treatment of carpet fiber with a fluorochemical finish to impart oil and water repellency and soil resistance to such fiber. In another aspect, it relates to fluorochemical and dispersions and emulsions, and their preparation, which are useful in such treatment.

BACKGROUND ART

In the industrial production of textiles, such as carpet and apparel, and such other fibrous substrates as paper and leather, it is common to treat such substrates with fluorochemicals containing fluoroaliphatic radicals (often designated by the symbol "$R_f$") to impart oil and water repellency to the surface of such substrates. Fluorochemicals of this type and their application to fibrous substrates are described in various prior art publications, e.g., U.S. Pat. Nos. 3,329,661 (Smith et al), 3,398,182 (Guenthner et al), 3,458,571 (Tokoli), 3,574,791 (Sherman et al), 3,728,151 (Sherman et al), 3,916,053 (Sherman et al), 4,144,367 (Landucci), 3,896,251 (Landucci), 4,024,178 (Landucci), 4,165,338 (Katsushima et al), 4,190,545 (Marshall), 4,215,205 (Landucci), 4,426,476 (Chang), 4,013,627 (Temple), 4,264,484 (Patel), 4,029,585 (Dettre), 3,462,296 (Raynolds et al), 4,401,780 (Steel), 4,325,857 (Champaneria et al), and Banks, R. E., Ed. "Organofluorine Chemicals and their Industrial Applications", Ellis Horwood, Ltd., West Sussex, England 226–230 (1979).

Although some fluorochemicals are useful in many applications and many are commercial products, some are relatively expensive to prepare and apply, others are difficult to apply, and others are not durable or do not impart the required properties to the extent desired.

Conventionally, fluorochemical compositions are applied to fibrous substrates, e.g., textiles and textile fiber, as solutions in organic solvents or as aqueous emulsions, as described in the above cited references, e.g., U.S. Pat. Nos. 3,329,661 and 4,024,178. In the preparation of aqueous emulsions, it is a common practice to add surfactants, e.g., cationic and nonionic surfactants, to aid in the formation and stability of the fluorochemical emulsion. However, the stability of some of these aqueous emulsions is not as good as desired for many applications, and the compatibility of such emulsions with other textile treating agents, e.g., fiber finish lubricants, has been a problem in some cases.

It is an object of this invention to provide a cationic fluorochemical having one or more monovalent fluoroaliphatic radicals, one or more N-containing moieties selected from carbodiimido and urylene moieties and an organic amino nitrogen derived cationic moiety.

Another object of this invention is to provide a non-ionic fluorochemical having one or more monovalent fluoroaliphatic radicals and urylene moieties, the non-ionic fluorochemical being a mixture of non-ionic fluorochemicals having an average urylene functionality greater than one.

Another object of this invention is to provide mixtures of cationic fluorochemical carbodiimides, urylenes or carbonylimines having an organic amino nitrogen derived cationic moiety and non-ionic fluorochemical carbodiimides, urylenes, or carbonylimino compounds.

A further object of this invention is to provide mixtures of non-ionic and cationic fluorochemicals in the form of stable microemulsions useful for the treatment of porous fibrous substrates, such as fibers, paper, leather and the like, to impart oil and water repellency thereto.

A further object of this invention is to provide blends of a mixture of non-ionic and cationic fluorochemicals, fluoroaliphatic radical-containing poly(oxyalkylenes) and/or hydrocarbon nonionic surfactants.

A further object of this invention is to provide fluorochemical treated textile fiber with a high percentage of the fluorochemical retained on the fiber through fiber processing and dyeing steps, and with durable water and oil repellency and soil resistance properties.

BRIEF DESCRIPTION

This invention provides, in one aspect, a cationic fluorochemical having one or more monovalent fluoroaliphatic radicals, one or more N-containing moieties selected from carbodiimido and urylene, the radicals and moieties being bonded together by hetero atom-containing or organic linking groups, and an organo amino nitrogen derived cationic moiety which is bonded to said N-containing moiety by hetero atom-containing or organic linking groups.

This invention also provides, in another aspect, a non-ionic fluorochemical having one or more monovalent fluoroaliphatic radicals and one or more urylene moieties, the radicals and moieties being bonded together by hetero atom-containing or organic linking groups, the non-ionic fluorochemical being a mixture of non-ionic fluorochemicals having an average urylene functionality greater than one.

This invention further provides a fluorochemical composition comprising a mixture of (1) a cationic fluorochemical having one or more monovalent fluoroaliphatic radicals, one or more N-containing moieties selected from carbodiimido, urylene, and carbonylimino, said radicals and moieties being bonded together by hetero atom-containing or organic linking groups, and an organo amino nitrogen-derived cationic moiety bonded to said N-containing moiety by hetero atom-containing or organic linking groups, and (2) a non-ionic fluorochemical having one or more monovalent fluoroaliphatic radicals, and one or more N-containing moieties selected from carbodiimido, urylene, and carbonylimino, said radicals and moieties being bonded together by hetero atom-containing or organic linking groups.

This invention also provides a blend (a) of the mixture of the cationic and non-ionic fluorochemicals, (b) a fluorochemical poly(oxyalkylene), and/or (c) hydrocarbon nonionic surfactant.

The cationic and non-ionic fluorochemicals, the mixtures thereof, and the fluorochemical blends of (a) the mixture of cationic and non-ionic fluorochemicals, (b) the fluorochemical poly(oxyalkylenes), and/or (c) the hydrocarbon non-ionic surfactant are useful in the form of aqueous dispersions and emulsions, preferably microemulsions, in the treatment of porous fibrous substrates, such as textile fibers (or filaments) during their manufacture, and useful also in the treatment of finished or fabricated fibrous substrates such as carpets, paper and leather, to impart oil and water repellency thereto.

DETAILED DESCRIPTION

Classes of the non-ionic and cationic fluorochemicals of this invention can be conveniently made concurrently as a mixture (I) of compounds which can be represented by the following general formulas $$R-Q-A-(BA)_n-Q-R \quad I' \qquad I$$

and $$[R-Q-A-(BA)_n(Q)_z]_pZY \quad I''$$

where the relative molar amounts of the non-ionic fluorochemical, I', to the cationic fluorochemical, I'', can widely vary, e.g., 99:1 to 1:99, preferably 80:20 to 60:40; each R is the same or different and is selected from hydrogen and terminal monovalent organic radicals such as alkyl, cycloalkyl, aryl, and combinations thereof, e.g. aralkyl, which radicals can contain fluoroaliphatic radicals ($R_f$) and hetero moieties, e.g. —O—, —S—, —N—, —Si—, and —CO—, and is preferably free of active (or isocyanate-reactive) hydrogen atoms (i.e., hydrogen atoms of groups, such as mercapto, amino, carboxyl, and aliphatic hydroxyl groups, that can react readily with isocyanate under urethane bond-forming conditions, e.g., 20° to 100° C.), each Q is the same or different divalent organic linking group; A is a divalent organic linking group which can contain said $R_f$, with the proviso that at least one R or A contains said $R_f$, each A being the same or different; B is a carbodiimide (—N=C=N—), urylene (—NH-CONH—), or carbonylimino (—OCONH— or —S-CONH—) group; Z is an organo amine nitrogen-derived cationic moiety; Y is an anionic group; n is a number of 1 up to 20, preferably 1 to 10, and most preferably 1 to 5; z is zero or one; and p is an integer of 1 to 3.

A mixture of subclasses (II) of the non-ionic and cationic fluorochemicals are represented by the following general formulas:

$$R-Q-A-(N=C=NA)_x-Q-R \quad II' \qquad II$$

and $$[R-Q-A-(N=C=NA)_x(Q)_z]_pZY \quad II''$$

where the relative molar amounts of the non-ionic fluorochemical carbodiimide, II', to the cationic fluorochemical carbodiimide, II'', in a mixture of the two fluorochemicals, can vary widely, e.g., 99:1 to 1:99, preferably 80:20 to 60:40, and R, Q, A, Z, Y, z, and p are as defined above for formulas I' and I'', and x is a number 1 to 20, preferably 1 to 10, most preferably 1 to 5.

A process for the preparation of the non-ionic and cationic fluorochemical carbodiimide is a modification of the process described in U.S. Pat. No. 4,024,178, cited above, which description is incorporated herein by reference.

A preferred mixture of the mixed non-ionic and cationic fluorochemicals is the fluorochemical urylene (III) represented by the following general formulas:

$$R-Q-A-(NHCONH-A)_x-Q-R \quad III' \qquad III$$

and $$[R-Q-A-(NHCONH-A)_x(Q)_z]_pZY \quad III''$$

where the relative molar amounts of non-ionic fluorochemical urylene, III', to cationic fluorochemical urylene, III'', in the mixture can vary widely, e.g., 99:1 to 1:99, preferably 80:20 to 60:40, and R, Q, A, Z, Y, x, z, and p are the same as described for II' and II''.

Another mixture of the non-ionic and cationic fluorochemicals are the carbonylimino fluorochemicals (IV) represented by the following general formulas:

$$R-Q-XCONH-A-NHCOX-Q-R \quad IV' \qquad IV$$

and $$[R-Q-XCONH-A-NHCOX(Q)_z]_pZY \quad IV''$$

where the relative molar amounts of the non-ionic fluorochemical carbonylimino, IV', to the cationic fluorochemical carbonylimino, IV'', in the mixture can vary widely, e.g., 99:1 to 1:99, preferably 80:20 to 60:40, and R, Q, A, Z, Y, z, and p are the same as described for II' and II'', and X is selected from O, S, or NR$^1$ where R$^1$ is hydrogen or lower alkyl.

Carbonylimino compounds for use in this invention can be prepared by reacting organic isocyanates with fluoroaliphatic radical-containing compounds having an isocyanate reactive OH, NR$^1$H or SH group. A preferred subclass of the carbonylimino compounds are those in which X of IV' and IV'' is O, viz., urethanes. These can be prepared by a modification (described below) of the process described in U.S. Pat. No. 3,398,182, cited above, which description is incorporated herein by reference.

In addition to the novel fluorochemical compositions which are mixtures of non-ionic and cationic fluorochemicals, certain of the compound or oligomer components of the fluorochemical compositions are believed novel per se, i.e., II'', III', and III'', In each of the above fluorochemical compositions, where there is a plurality of R, Q, A, and X groups or moieties, each group can be the same or different. Also, the compounds or oligomers of this invention generally encompass individual compounds or represent mixtures of such compounds as they are obtained as products from reactions used in their preparation. In addition, small amounts of by-products, with and without the fluoroaliphatic group $R_f$, and not specifically represented by any of the above formulas, can also be present in such reaction products because of the reaction conditions involved in their preparation. The presence of such small amounts of by-products, generally less than about 10 weight percent, does not affect the usefulness of the non-ionic and cationic fluorochemicals of this invention.

The fluoroaliphatic radical, $R_f$, referred to above is a fluorinated, stable, inert, non-polar, preferably saturated, monovalent moiety which is both oleophobic and hydrophobic. It can be straight chain, branched chain, or, if sufficiently large, cyclic, or combinations thereof, such as alkylcycloaliphatic radicals. The skeletal chain of the fluoroaliphatic radical can include catenary oxygen, hexavalent sulfur, and/or trivalent nitrogen hetero atoms bonded only to carbon atoms, such hetero atoms providing stable linkages between fluorocarbon portions of $R_f$ and not interferring with the inert character of the $R_f$ radical. While $R_f$ can have a large number of carbon atoms, compounds or oligomers where $R_f$ is not more than 20 carbon atoms will be adequate and preferred since large radicals usually represent a less efficient utilization of fluorine than smaller $R_f$ radicals. Generally $R_f$ will have 3 to 20 carbon atoms, preferably 6 to about 12, and will contain 40 to 78 weight percent, preferably 50 to 78 weight percent, fluorine. The terminal portion of the $R_f$ group has at least three fully fluorinated carbon atoms, e.g., $CF_3CF_2CF_2-$, or $(CF_3)_2CF-$ and the preferred compounds are those in which the $R_f$ group is fully or substantially completely fluorinated, as in the case where $R_f$ is perfluoroalkyl, $C_nF_{2n+1}$.

The function of the linking group Q in the above formulas is to bond the $R_f$ group directly to A and Z groups or indirectly to A and Z through hetero atom-containing moieties. Each Q can comprise a hetero atom-containing group or an organic group or a combination of such groups, examples of which are polyvalent aliphatic, e.g., $-CH_2-$, $-CH_2CH_2-$, and $-CH_2CH(CH_2-)_2$, polyvalent aromatic, oxy, thio, carbonyl, sulfone, sulfoxy, $-N(CH_3)-$, sulfonamido, carbonamido, sulfonamidoalkylene, carbonamidoalkylene, carbonyloxy, urethane, e.g., $-CH_2CH_2OCONH-$, and urea, e.g., $-NHCONH-$. The linkage Q for a specific fluorochemical compound or oligomer useful in this invention will be dictated by the ease of preparation of such a compound and the availability of necessary precursors thereof. However, the Q group is preferably free of active hydrogen atoms as defined above.

The divalent organic linking groups, A, connect successive B groups, i.e., carbodiimide, urylene, and carbonylimino groups, when x is greater than one and also may link the B groups to Q groups. Illustrative linking groups A are alkylene groups, such as ethylene, isobutylene, hexylene, and methylenedicyclohexylene, having 2 to about 20 carbon atoms, aralkylene groups, such as $-CH_2C_6H_4CH_2-$ and $-C_6H_4CH_2C_6H_4-$, having up to 20 carbon atoms, arylene groups, such as $-C_6H_4-$, aliphatic polyethers, such as $-(C_2H_4O)_yC_2H_4-$, where y is 1 to about 5, and combinations thereof. Such groups can also include other hetero moieties (besides $-O-$), including $-S-$ and

However, A is preferably free of groups with active hydrogen atoms.

The A group can be a residue of an organic diisocyanate from which the carbodiimido, urylene, and carbonylimino moieties are derived, that is, A can be the divalent radical obtained by removal of the isocyanate groups from an organic diisocyanate. Suitable diisocyanate precursors may be simple, e.g., tolylene-2,4-diisocyanate, methylene bis(4-phenyleneisocyanate), and mixtures thereof, or complex, as formed by the reaction of a simple diisocyanate with an organic diol or polyol in appropriate proportions to yield an isocyanate-terminated polyurethane. Other isocyanates can also be used as starting materials. Some of these are described, for example, in U.S. Pat. No. 4,174,433. Representative A groups include $-CH_2C_6H_4CH_2C_6H_4CH_2-$, $-C_6H_{10}CH_2C_6H_{10}-$, $-(CH_2)_6-$, $-C_6H_4CH_2C_6H_4-$, $C_8F_{17}SO_2N+C_2H_4OCONHC_6H_3(CH_3)+_2$, and $-(CH_2)_6[NHCOO(CH_2)_4OCONH(CH_2)_6-]_2$. Although the fluorochemical carbodiimides, urylenes, and carbonylimino compounds and compositions used in this invention generally and preferably are derived from diisocyanates, they can be derived from triisocyanates, e.g., $OCNC_6H_4CH_2C_6H_3(NCO)CH_2C_6H_4NCO$. A mixture of di and tri-isocyanates can be used to provide fluorochemical carbodiimides, urylenes and carbonylimino compounds which are branched but still retain the desired solubility and dispersibility characteristics of the linear fluorochemical compositions depicted by formula I.

The Z group in the above formulas represents an organo amino nitrogen-derived cationic moiety, such as a polyalkyl ammonium group. Z is preferably a quaternary ammonium group. Representative Z groups include $-C_2H_4N^+(CH_3)_3$, $-C_2H_4N^+(CH_3)_2C_2H_5$, $-C_2H_4N^+(C_2H_5)_2CH_2CH=CH_2$, $-C_2H_4N^+(CH_3)_2CH_2C_6H_5$, $+C_2H_4)_2N^+(CH_3)_2$, $+C_2H_4)_3N^+CH_3$,

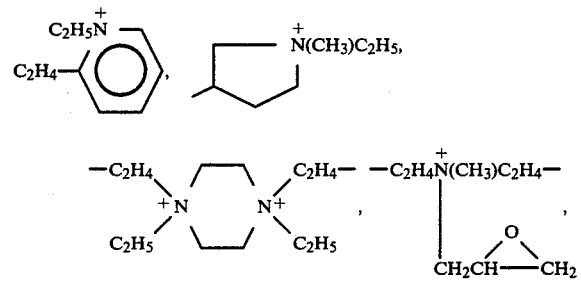

The Z groups are generally formed in a two-step reaction from an active hydrogen group-containing (i.e., hydroxyl, amino or mercapto) tertiary organo amine with a diisocyanate (along with an equal, or generally higher, molar amount of a fluoroaliphatic alcohol); the thus formed substituted amine is then quaternized with a suitable reagent or neutralized with an acid.

The Y moiety in the above formulas represents an anionic group, which is the counterion of the Z groups. It is introduced in the quaternization or neutralization step involving the tertiary amino nitrogen atom present in the precursors of the cationic fluorochemical compositions of this invention. Representative Y groups included $Cl^-$, $Br^-$, $I^-$, $C_2H_5SO_4^-$, $CH_3SO_4^-$, $CF_3SO_3^-$, $HOCH_2COO^-$, and $CH_3COO^-$.

Generally, the mixture of non-ionic and cationic carbodiimide, urylene or carbonylimino fluorochemicals of this invention will contain about 20 to 70 weight percent, preferably about 25 to 50 weight percent, of fluorine bonded to the carbon atoms in the $R_f$ radical(s). If the fluorine content is less than about 20 weight percent, the oil repellency of the fibrous substrate treated with the mixture of non-ionic cationic carbodiimide, urylene, or carbonylimino fluorochemicals will generally be decreased, while fluorine contents greater than about 70 weight percent are unnecessary to achieve the desired surface properties and thus represent an uneconomical use of fluorine.

Representative reaction schemes for the preparation of the mixtures of non-ionic and cationic fluorochemicals of this invention are outlined below, wherein the product mixtures of schemes 1, 2 and 3 are examples of the mixtures of non-ionic and cationic fluorochemicals II, III and IV, respectively, shown above. In these schemes, a portion of the $R_fQ'OH$ reactant can be replaced by $RQ'OH$ where R is as defined for formulas I above; Q' is an organic linking group similar to but not the same as Q; and R' and R" groups are organic radicals, preferably lower alkyl radicals.

SCHEME 1

$5R_fQ'OH + 9A(NCO)_2 + R'_2NQ'OH \longrightarrow$ $5R_fQ'OCONHANCO + R'_2NQ'OCONHANCO +$ $3A(NCO)_2 \xrightarrow[-6CO_2]{\text{Catalyst, heat}} 2R_fQA(N=C=NA)_2QR_f +$ $R_fQA(N=C=NA)_2QNR'_2 \xrightarrow{R''Y}$ $2R_fQA(N=C=NA)_2QR_f + R_fQA(N=C=NA)_2Q\overset{+}{N}(R')_2R''Y^-$

SCHEME 2

Product mixture of Scheme 1 $\xrightarrow{H_2O, \text{ heat}}$ $2R_fQA(NHCONHA)_2QR_f + R_fQA(NHCONHA)_2Q\overset{+}{N}(R')_2R''Y^-$

SCHEME 3

$5R_fQ'OH + 3A(NCO)_2 + R'_2NO'OH \longrightarrow$ $2R_fO'OCONHANHCOOO'R_f +$ $R_fQ'OCONHANHCOOQ'NR'_2 \xrightarrow{R''Y}$ $2R_fQ'OCONHANHCOOQ'R_f +$ $R_fQ'OCONHANHCOOQ'\overset{+}{N}(R')_2R''Y^-$ The cationic fluorochemicals may be separated from the non-ionic fluorochemicals in the reaction product by known methods, such as ion chromatographic separation methods. However, the use of the mixture of non-ionic and cationic fluorochemicals is the preferred mode of the present invention and the reaction products need not be resolved.

Representative reactants, including $R_f$ reactants, for the preparation of the fluorochemical compositions of this invention include $C_8F_{17}SO_2N(C_2H_5)C_2H_4OH$, $C_8F_{17}C_2H_4OH$, $C_7F_{15}CH_2OH$, $C_7F_{15}CON(C_2H_5)C_2H_4OH$, $C_8F_{17}C_2H_4SC_2H_4OH$, $(CF_3)_2CF(CF_2)_8C_2H_4OH$, $(CF_3)_2CFOC_2F_4C_2H_4OH$, $C_8F_{17}C_2H_4SO_2N(CH_3)C_4H_8OH$, $C_8F_{17}SO_2N(CH_3)C_3H_6NH_2$,

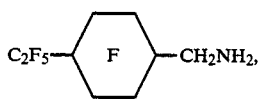

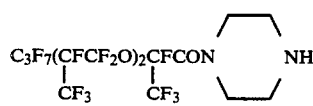

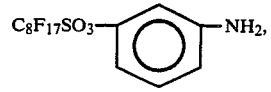

$C_8F_{17}C_6H_4NH_2$, $C_8F_{17}C_6H_4NCO$, $C_7F_{15}CH_2NCO$, $C_8F_{17}C_2H_4SH$, $C_7F_{15}CON(CH_3)C_2H_4SH$, $C_8H_{17}OH$, $C_{12}H_{25}OH$, $C_3H_7OH$, $C_6H_5OH$, $C_6H_4CH_2OH$, $C_4H_9NH_2$, $C_6H_{13}NH_2$, $(C_4H_9)_2NH$, $C_{12}H_{25}SH$, and $C_{18}H_{37}NCO$.

Representative organic isocyanate reactants useful in the above schemes include tolylene-2, 4-diisocyanate, hexamethylene diisocyanate, methylenebis(4-phenyleneisocyanate), methylenebis(4-cyclohexyleneisocyanate), xylylene diisocyanate, 1-methoxy-2,4-phenylene diisocyanate, p(1-isocyanatoethyl)phenyl isocyanate, and isophorone diisocyanate, and mixtures thereof.

Representative active hydrogen group-containing tertiary organo amine reactants useful in the above schemes include 2-dimethylaminoethanol, 2-diethylaminoethanol, 2-diisopropylaminoethanol, N-methyldiethanolamine, triethanolamine, 1-methyl-3-pyrrolidinol, 2(2-hydroxyethyl)pyridine, N(2-hydroxyethyl)morpholine, 1,4-bis(2-hydroxypropyl)piperazine, 1,1-dimethyl-4-dimethylamino-n-butanol, N(2-hydroxyethyl)pyrrolidine, 1-methyl-3-piperidinol, N(2-hydroxyethyl)-N-methylaniline, 2-dimethylaminoethanethiol, N,N-bis(2-mercaptoethyl)methylamine, 4-diethylamino-1-methyl-n-butanol, 1-dimethylamino-2-propanol, 3-dimethylamino-1-propanol, 3-dimethylamino-2-hydroxy-n-propanol, N,N-dimethyl-1,3-propanediamine, N(2-aminoethyl)morpholine, 4(2-aminoethyl)pyridine, tris(2-aminoethyl)amine, and mixtures thereof.

Quaternizing alkylating agents and acids useful in this invention include methyl iodide, methyl bromide, allyl chloride, benzyl chloride, diethylsulfate, dimethylsulfate, epichlorohydrin, hydrochloric acid, acetic acid, and glycolic acid.

The fluoroaliphatic radical-containing poly(oxyalkylenes), called fluorochemical oxyalkylenes herein for brevity, used as component (b) in the fluorochemical blends of this invention are normally liquid or low melting solids. They contain one or more $R_f$ groups (as defined above) and one or more poly(oxyalkylene) moieties bonded together by hetero atom-containing or organic linking groups or combinations of such groups.

A class of fluorochemical oxyalkylenes useful in this invention are fluoroaliphatic polymers (or oligomers, the term polymer hereinafter including oligomer unless otherwise indicated) represented by the general formulas:

$(R_f)_sD[(R^3)_yD'G]_t$    V $\{(R_f)_sD[(R^3)_yD'G']_t\}_w$    VI where $R_f$ is a fluoroaliphatic radical like that described for general formula I, D is a linkage through which $R_f$ and $(R^3)_y$ moieties are covalently bonded together, $(R^3)_y$ is a poly(oxyalkylene) moiety, $R^3$ being an oxyalkylene group with 2 to 4 carbon atoms and y is an integer (where the above formulas are those of individual compounds) or a number (where the above formulas are those of mixtures) at least 5, generally 10 to 75 and can be as high as 100 or higher, G is a hydrogen atom or a monovalent terminal organic radical, G' is G or a valence bond, with the proviso that at least one G' is a valence bond connecting a D-bonded $R^3$ radical to another D, D' is a linkage through which G, or G', and $R^3$ are covalently bonded together, s is a number of at least 1 and can be as high as 25 or higher, t is a number of at least 1, and can be as high as 60 or higher, and w is a number greater than 1, and can be as high as 30 or higher.

In formulas V and VI, where there are a plurality of $R_f$ radicals, they are either the same or different. This also applies to a plurality of D, D', $R_3$, G, G', and, in formula VI, a plurality of s, y and t.

Generally, the oxyalkylene polymers will contain about 5 to 40 weight percent, preferably about 10 to 30 weight percent, of carbon-bonded fluorine. If the fluorine content is less than about 10 weight percent, impractically large amounts of the polymer will generally be required, while fluorine contents greater than about 35 weight percent result in polymers which have too low a solubility to be efficient.

In said poly(oxyalkylene) radical, $(R^3)_y$, $R^3$ is an oxyalkylene group having 2 to 4 carbon atoms, such as —OCH$_2$CH$_2$—, —OCH$_2$CH$_2$CH$_2$—, —OCH(CH$_3$)CH$_2$—, and —OCH(CH$_3$)CH(CH$_3$)—, the oxyalkylene units in said poly(oxyalkylene) being the same, as in poly(oxypropylene), or present as a mixture, as in a heteric straight or branched chain or randomly distributed oxyethylene and oxypropylene units or as in a straight or branched chain of blocks of oxyethylene units and blocks of oxypropylene units. The poly(oxyalkylene) chain can be interrupted by or include one or more catenary linkages. Where said catenary linkages have three or more valences, they provide a means for obtaining a branched chain or oxyalkylene units. The poly(oxyalkylene) radicals in the polymers can be the same or different, and they can be pendent. The molecular weight of the poly(oxyalkylene) radical can be as low as 220 but preferably is about 500 to 2500 and higher.

The function of the linkages D and D' is to covalently bond the fluoroaliphatic radicals, $R_f$, the poly(oxyalkylene) moieties, $(R^3)_y$ and radicals G and G' together in the oligomer. D and D' can be a valence bond, for example where a carbon atom of a fluoroaliphatic radical is bonded or linked directly to a carbon atom of the poly(oxyalkylene) moiety. D and D' each can also comprise one or more linking groups such as polyvalent aliphatic and polyvalent aromatic, oxy, thio, carbonyl, sulfone, sulfoxy, phosphoxy, amine, and combinations thereof, such as oxyalkylene, iminoalkylene, iminoarylene, sulfoamido, carbonamido, sulfonamidoalkylene, carbonamidoalkylene, urethane, urea, and ester. The linkages D and D' for a specific oxyalkylene polymer will be dictated by the ease of preparation of such a polymer and the availability of necessary precursors thereof.

From the above description of D and D' it is apparent that these linkages can have a wide variety of structures, and in fact where either is a valence bond, it doesn't even exist as a structure. However large D and D' are, the fluorine content (the locus of which is $R_f$) is in the aforementioned limits set forth in the above description, and in general the sum of the D and D' contents of the polymer is preferably less than 10 weight percent of the polymer.

The monovalent terminal organic radical, G, is one which is covalently bonded through D' to the poly(oxyalkylene) radical.

Though the nature of G can vary, it preferably is such that it compliments the poly(oxyalkylene) moiety in maintaining or establishing the desired solubility of the oxyalkylene. The radical G can be a hydrogen atom, acyl, such as C$_6$H$_5$C(O)—, alkyl, preferably lower alkyl, such as methyl, hydroxyethyl, hydroxypropyl, mercaptoethyl and aminoethyl, or aryl, such as phenyl, chlorophenyl, methoxyphenyl, nonylphenyl, hydroxyphenyl, and aminophenyl. Generally, D'G will be less than 50 weight percent of the $(R^3)_y$D'G moiety.

The fluoroaliphatic radical-containing oxyalkylene used in this invention can be prepared by a variety of known methods, such as by condensation, free radical, or ionic homopolymerization or copolymerization using solution, suspension, or bulk polymerization techniques, e.g., see "Preparative Methods of Polymer Chemistry", Sorenson and Campbell, 2nd ed., Interscience Publishers (1968). Classes of representative oxyalkylenes useful in this invention include polyesters, polyurethanes, polyepoxides, polyamides, and vinyl polymers such as polyacrylates and substitute polystyrenes.

The polyacrylates are a particularly useful class of oxyalkylenes and they can be prepared, for example, by free radical initiated copolymerization of a fluoroaliphatic radical-containing acrylate with a poly(oxyalkylene)acrylate, e.g., monoacrylate or mixtures of diacrylate and monoacrylate. As an example, a fluoroaliphatic acrylate, $R_f$—R''—O$_2$C—CH=CH$_2$ (where R'' is, for example, sulfonamidoalkylene, carbonamidoalkylene, or alkylene), e.g., C$_8$F$_{17}$SO$_2$N(C$_4$H$_9$)CH$_2$CH$_2$O$_2$CCH=CH$_2$, can be copolymerized with a poly(oxyalkylene)monoacrylate, CH$_2$=CHC(O)(R$^3$)$_x$OCH$_3$, to produce a polyacrylate oxyalkylenes.

Further description of fluorochemical oxyalkylenes useful in this invention will be omitted in the interest of brevity since such compounds and their preparation are known, e.g., said U.S. Pat. No. 3,787,351 and U.S. Pat. No. 4,289,892, both of which are incorporated herein by reference.

The relative amounts of component (a), the mixture of non-ionic and cationic fluorochemicals, and component (b), the fluorochemical poly(oxyalkylene), in the fluorochemical blend used in this invention to treat porous, fibrous substrates can vary over a broad range and will be selected to provide the desired balance of surface properties on the treated fiber of the finished article. Generally, component (a) will be the major amount of the blend and component (b) will be the minor amount. The particular amount depends on the particular composition of the textile fiber or article to be treated and the particular chemical composition of (a) and (b), as well as the application procedures used.

Generally, the relative amounts of components (a) and (b) fall within the following ranges:

| Component | Amount of fluorochemical solids in blend (wt. %) | | |
|---|---|---|---|
| | General Broad Range | Preferred Broad Range | Most Preferred Range |
| (a) | 40 to 99 | 60 to 99 | 70 to 95 |
| (b) | 1 to 60 | 1 to 40 | 5 to 30 |

The mixtures of non-ionic and cationic fluorochemicals of this invention, and blends thereof with fluorochemical poly(oxyalkylenes), can be utilized as solutions in organic solvents or as aqueous emulsions or dispersions. Aqueous emulsions and microemulsions are particularly useful foams for the mixtures of non-ionic and cationic fluorochemicals and blends thereof with poly(oxyalkylenes) because of the ease of formation and stability of these emulsions, aided by the presence of the built-in cationic moiety. Mixing of the neat, solid, or semi-solid mixtures of non-ionic and cationic fluorochemicals, or organic solvents, thereof, with water generally yields a stable emulsion, and, in most cases, a microemulsion, as indicated by the transparent or nearly transparent character of the aqueous emulsion and small size of the emulsion particles. Frequently the emulsification process requires only mild agitation and the emulsions are essentially spontaneously formed. Conventional fluorochemical aqueous emulsions generally have particle sizes in the 0.1 to 1 micron range, while microemulsions generally have particle sizes less than 0.2 micron.

The mixed non-ionic and cationic fluorochemicals and blends thereof with poly(oxyalkylenes) of this invention readily form aqueous microemulsions with very little mechanical work input being required. The liquid-liquid interfacial tension is less than about 0.1 dyne/cm at 25 weight percent of fluorochemical. In the microemulsion, the droplet weight average diameter is less than about 0.1 micron as determined by liquid exclusion chromotography. The turbidity of the microemulsion is less than about 1 cm$^{-1}$ at 1 volume percent of dispersed phase. Turbidity is defined as natural log $(I_o/I)/l$ where $I_o$, I, and l are the intensity of the incident light, transmitted light, and scattering path length, respectively.

In the preparation of these aqueous emulsions, it is generally beneficial in ease of formation and particularly in emulsion stability to include a nonionic surfactant; thus the fluorochemical blends of this invention comprising (a) the mixed non-ionic and cationic fluorochemicals and (b) fluorochemical poly(oxyalkylenes) and/or (c) hydrocarbon non-ionic surfactant yield emulsions and microemulsions having excellent emulsification properties. Also these blends generally yield improved oil and water repellency when applied to porous substrates, e.g., carpet fibers and carpets, when compared to previously known fluorochemicals.

Representative hydrocarbon nonionic surfactants useful as component (c) in this invention include the following commercial poly(oxyalkylene) compounds: poly(oxyethylene)sorbitan monooleate, e.g., "Tween" 80; alkylaryl polyethylene glycol ether, e.g., "Surfonic" N-120; ethoxylated lauryl alcohol, e.g., "Siponic" L-16; octylphenoxy polyethoxy ethanol, e.g., "Triton" X-102; polyethylene glycol ether of sec. alcohol, e.g., "Tergitol" 15-S-15; poly(oxyethylene)cetyl ether, e.g., "Brij" 58; and octylphenoxypoly(oxyethylene)ethanol, e.g., "Igepal" CA 720. The surfactants may be used singly or in combination.

Each of these surfactants has a hydrophilelipophile balance value (HLB) in the range of about 13 to 16. Hydrocarbon poly(oxyalkylenes) with higher or lower values were found not be as useful in promoting emulsion stability and quality, but may be useful in surfactant blends.

Porous fibrous substrates which can be treated in accordance with this invention include textile fibers (or filaments), and finished or fabricated fibrous articles such as textiles, e.g., carpet, paper, paperboard, leather, and the like. The textiles include those made from natural fibers, such as cotton and wool and those made from synthetic organic fibers, such as nylon, polyolefin, acetate, rayon, acrylic, and polyester fibers. Especially good results are obtained on nylon and polyester fibers. The fibers or filaments as such or in an aggregated form, e.g., yarn, tow, web, or roving, or the fabricated textile, e.g., articles such as carpet and woven fabrics, can be treated with the mixtures of non-ionic and cationic fluorochemicals. The treatment can be carried out by applying the mixture of non-ionic and cationic fluorochemicals, or blends thereof with poly(oxyalkylene), as organic solutions or aqueous or organic dispersions by known techniques customarily used in applying fluorochemicals, e.g., fluorochemical acrylate copolymers, to fibers and fibrous substrates. If desired, such known fluorochemicals as fluoroaliphatic radical-containing polymers, e.g., acrylates and methacrylates, can be used in conjunction with the above-described cationic fluorochemical blends. The fluorochemical treatment, with the fluorochemical being in the form of an aqueous emulsion or organic solution, can be carried out by immersing the fibrous substrates in a bath containing the cationic fluorochemical blends, padding the substrate or spraying the same with the fluorochemical emulsions or solutions, or by foam, kiss-roll, or metering applications, e.g., spin finishing, and then drying the treated substrates if solvent is present. If desired, the fluorochemical composition or blends can be co-applied with conventional fiber treating agents, e.g., antistatic agents. It is preferred that the conventional fiber treating agent and the cationic fluorochemical are both in the form of aqueous emulsions. A particular advantage of using fluorochemical blends having a high level of nonionic hydrocarbon co-surfactant is good compatibility with anionic spin finish components or additives.

In the manufacture of synthetic organic textile fibers (see, for example, the review article in Kirk-Othmer, *Encyclopedia of Polymer Science and Technology*, 8, 374–404, 1968), the first step that normally takes place in the process, following initial formation of the filaments (e.g., by melt spinning or solvent spinning), is coating the fiber surface with a small amount of fiber finish comprising lubricating and antistatic agents. It is particularly advantageous to treat such textile fibers, e.g., nylon 6, nylon 66, with the cationic fluorochemical compositions or blends of this invention in conjunction with the spin finish being applied to such textile fibers.

Fiber finishes are generally produced in the form of dilute aqueous emulsions which principally contains said lubricant and antistatic agent as well as emulsifier (surfactant) and may also contain materials such as bactericides and antioxidants.

Representative lubricants include mineral oils, waxes, vegetable oils (triglycerides) such as coconut oil, peanut oil, and castor oil, synthetic oils, such as esters, polyoxyethylene derivatives of alcohols and acids, and silicone oils.

The antistatic agents, emulsifiers, and surfactants which can be incorporated into the fiber finish are selected from similar chemical classes, which include:
(a) anionics, such as fatty acid soaps, sulfated vegetable oils, salts or alkyl and ethoxylated alkyl phosphates;
(b) cationics, such as fatty amines, quaternary ammonium compounds, and quaternary phosphonium compounds;
(c) nonionics, such as glyceryl monooleate, ethoxylated alcohols, ethoxylated fatty acids, and ethoxylated fatty amides; and
(d) amphoterics, such as betaines, amino acids and their salts.

A preferred method of applying the mixtures of non-ionic and cationic fluorochemicals and blends thereof with poly(oxyalkylenes) of this invention to synthetic organic fibers is to incorporate the mixture or blend into the above-described fiber finishes in an amount sufficient to achieve the desired properties, oil and water repellency and soil resistance. Generally, the amount of fluorochemical to be used will be that sufficient to retain on the fiber of the finished article, e.g., carpet, about 200 to 1600 ppm fluorine based on the weight of the fiber. Such additions to the conventional fiber finish can be carried out without sacrificing or adversely affecting typical requirements that conventional fiber finishes must meet, namely lubrication, thermal stability, low fuming at elevated temperature, and wetting for fiber dyeability (color addition). The conventional finish components of the fiber finishes containing the cationic fluorochemical compositions and blends of this invention can be removed in a conventional manner after the fiber is manufactured in fiber form, e.g., carpets and upholstery fabrics. The cationic fluorochemical compositions and blends withstand the typical conditions encountered during fiber and yarn processing and also survive the more severe processing conditions which the greige goods encounter such as scouring and dyeing, and the finished goods encounter, such as washing, steam cleaning, and dry cleaning. The cationic fluorochemical compositions and blends do not interfere with, and are durable through, the normal fiber processing steps, e.g., drawing, texturizing, and heat setting, and provide oil and water repellency and antisoiling properties to the finished article, e.g. carpet made from the treated fibers.

The conventional application methods used to apply finishes to fibers (or filaments) can be used with the cationic fluorochemical compositions or blends of this invention. Such methods include the use of either (a) a revolving ceramic cylinder, e.g., kiss-roll, which is partially immersed in a pan containing the fluorochemical finish, over which the moving filaments pass and pick up a thin film of finish, (b) a metering pump supplying finish through a slot or hole in a fiber guide over which the moving filaments pass, (c) an immersion finish bath, or (d) spraying devices.

Representative mixtures of non-ionic and cationic fluorochemicals compositions of this invention are shown in Table 1.

TABLE 1

Mixtures of $RQA(N=C=NA)_nQR$ and $RQA(N=C=NA)_nQZY$

| No. | R—Q— | —A— | n | —QZ | Y | Amount of cationic fluorochemical in mixture, mole % |
|---|---|---|---|---|---|---|
| 1 | $C_8F_{17}-SO_2N(C_2H_5)C_2H_4OCONH-$ | $-C_6H_4CH_2C_6H_4-$ | 2 | $NHCOOC_2H_4\overset{+}{N}(CH_3)_2CH=CH_2$ | $Cl^-$ | 33 |
| 2 | $C_8F_{17}-SO_2N(C_2H_5)C_2H_4COCNH-$ | $-C_6H_4CH_2C_6H_4-$ | 2 | $NHCOOC_2H_4\overset{+}{N}(CH_3)_2CH_2C_6H_5$ | $Cl^-$ | 33 |
| 3 | $C_8F_{17}-SO_2N(C_2H_5)C_2H_4OCONH-$ | $-C_6H_4CH_2C_6H_4-$ | 2 | $NHCOOC_2H_4\overset{+}{N}(CH_3)_3$ | $CH_3SO_4-$ | 33 |
| 4 | $C_8F_{17}-SO_2N(C_2H_5)C_2H_4OCONH-$ | $-C_6H_4CH_2C_6H_4-$ | 2 | $NHCOOC_2H_4\overset{+}{N}(CH_3)_2C_2H_5$ | $C_2H_5SO_4-$ | 33 |
| 5 | $C_8F_{17}-SO_2N(C_2H_5)C_2H_4OCONH-$ | $-C_6H_4CH_2C_6H_4-$ | 2 | 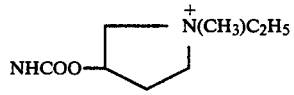 | $C_2H_5SO_4-$ | 31 |
| 6 | $C_8F_{17}-SO_2N(C_2H_5)C_2H_4OCONH$ | $-C_6H_4CH_2C_6H_4-$ | 2 | 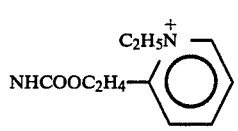 | $C_2H_5SO_4-$ | 26 |
| 7 | $C_8F_{17}-SO_2N(C_2H_5)C_2H_4OCONH-$ | $-C_6H_4CH_2C_6H_4-$ | 2 | 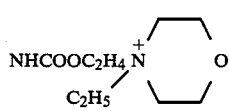 | $C_2H_5SO_4-$ | 35 |
| 8 | $C_8F_{17}-SO_2N(C_2H_5)C_2H_4OCONH-$ | $-C_6H_4CH_2C_6H_4-$ | 2 | $NHCOOC_2H_4\overset{+}{N}(C_2H_5)_3$ | $C_2H_5SO_4-$ | 27 |
| 9 | $C_8F_{17}-SO_2N(C_2H_5)C_2H_4OCONH-$ | $-CH_2C_6H_4CH_2-$ | 2 | $NHCOOC_2H_4\overset{+}{N}(CH_3)_2C_2H_5$ | $C_2H_5SO_4-$ | 35 |
| 10 | $C_8F_{17}-SO_2N(C_2H_5)C_2H_4OCONH-$ | $-(CH_3)C_6H_3-$ | 1 | $NHCOOC_2H_4\overset{+}{N}(CH_3)_2C_2H_5$ | $C_2H_5SO_4-$ | 27 |

TABLE 1-continued

Mixtures of RQA(N=C=NA)$_n$QR and RQA(N=C=NA)$_n$QZY

| No. | R—————Q— | —A— | n | —QZ | Y | Amount of cationic fluorochemical in mixture, mole % |
|---|---|---|---|---|---|---|
| 11 | $C_8F_{17}$—$SO_2N(CH_3)C_4H_8OCONH$— | —$C_6H_4CH_2C_6H_4$— | 2 | $NHCOOC_2H_4\overset{+}{N}(CH_3)_2C_2H_5$ | $C_2H_5SO_4$— | 33 |
| 12 | $C_8F_{17}$—$SO_2N(C_2H_5)C_2H_4OCONH$— | —$C_6H_4CH_2C_6H_4$— | 2 | $NHCOOC_2H_4\overset{+}{N}(C_2H_5)$—morpholino | $C_2H_5SO_4$— | 25 |
| 13 | $C_8F_{17}$—$C_2H_4OCONH$— | —$(CH_3)C_6H_3$— | 2 | $NHCOOC_2H_4\overset{+}{N}(CH_3)_2C_2H_5$ | $C_2H_5SO_4$— | 26 |
| 14* | $C_8F_{17}$—$SO_2N(C_2H_5)C_2H_4OCONH$—<br>$C_8H_{17}$—OCONH— | —$(CH_3)C_6H_3$—<br>—$(CH_3)C_6H_3$— | 2 | $NHCOOC_2H_4\overset{+}{N}(CH_3)_2C_2H_5$ | $C_2H_5SO_4$— | 33 |

*R—Q— molar ratio $C_8F_{17}$—$SO_2N(C_2H_5)C_2H_4OCONH:C_8H_{17}$—OCONH :: 3:1

Representative mixtures of non-ionic and cationic fluorochemical urylenes are shown in Table 2.

TABLE 2

Mixtures of $R_fQA(NHCONHA)_nQR_f$ and $R_fQA(NHCONHA)_nQZY$

| No. | R—————Q— | —A— | n | —QZ | Y | Amount of cationic fluorochemical in mixture, mole % |
|---|---|---|---|---|---|---|
| 1 | $C_8F_{17}$—$SO_2N(C_2H_5)C_2H_4OCONH$— | —$C_6H_4CH_2C_6H_4$— | 2 | $NHCOOC_2H_4\overset{+}{N}(CH_3)_2C_2H_5$ | $C_2H_5SO_4$— | 33 |
| 2 | $C_8F_{17}$—$SO_2N(C_2H_5)C_2H_4OCONH$— | —$C_6H_4CH_2C_6H_4$— | 2 | $NHCOOC_2H_4\overset{+}{N}(C_2H_5)$—morpholino | $C_2H_5SO_4$— | 25 |
| 3 | $C_8F_{17}$—$SO_2N(C_2H_5)C_2H_4OCONH$— | —$(CH_3)C_6H_3$— | 2 | $NHCOOC_2H_4\overset{+}{N}(CH_3)_2C_2H_5$ | $C_2H_5SO_4$— | 27 |
| 4 | $C_8F_{17}$—$SO_2N(C_2H_5)C_2H_4OCONH$— | —$(CH_3)C_6H_3$— | 2 | $NHCOOC_2H_4\overset{+}{N}(CH_3)_2C_2H_5$ | $C_2H_5SO_4$— | 27 |
| 5 | $C_8F_{17}$—$C_2H_4OCONH$— | —$(CH_3)C_6H_3$— | 2 | $NHCOOC_2H_4\overset{+}{N}(CH_3)_2C_2H_5$ | $C_2H_5SO_4$— | 26 |
| 6* | $C_8F_{17}$—$SO_2N(C_2H_5)C_2H_4OCONH$—<br>$C_8H_{17}$—OCONH— | —$(CH_3)C_6H_3$—<br>—$(CH_3)C_6H_3$— | 2 | $NHCOOC_2H_4\overset{+}{N}(CH_3)_2C_2H_5$ | $C_2H_5SO_4$— | 33 |

R—Q— molar ratio $C_8F_{17}$—$SO_2N(C_2H_5)C_2H_4OCONH:C_8H_{17}$—OCONH :: 3:1

Representative mixtures of nonionic and cationic carbonylimino fluorochemicals are shown in Table 3.

TABLE 3

Mixture of $R_f$—Q—OCONH—A—NHCOO—Q—$R_f$ and $[R_f$—Q—OCONH—A—NHCOX$]_p$ZY

| No. | $R_f$—————Q— | —X— | A | p | —Z | Y | Amount of cationic fluorochemical in mixture, mole % |
|---|---|---|---|---|---|---|---|
| 1 | $C_8F_{17}$—$SO_2N(C_2H_5)C_2H_4$— | O | $CH_2C_6H_4CH_2$ | 1 | $C_2H_4\overset{+}{N}(CH_3)_2C_2H_5$ | $C_2H_5SO_4$— | 23 |
| 2 | $C_8F_{17}$—$SO_2N(C_2H_5)C_2H_4$— | O | $C_6H_4CH_2C_6H_4$ | 1 | $C_2H_4\overset{+}{N}(CH_3)_2C_2H_5$ | $C_2H_5SO_4$— | 28 |
| 3 | $C_8F_{17}$—$SO_2N(C_2H_5)C_2H_4$— | O | $(CH_3)C_6H_3$ | 1 | $C_2H_4\overset{+}{N}(CH_3)_2C_2H_5$ | $C_2H_5SO_4$— | 25 |
| 4 | $C_8F_{17}$—$SO_2N(C_2H_5)C_4H_8$— | O | $(CH_3)C_6H_3$ | 2 | $C_2H_4\overset{+}{N}(CH_3)C_2H_4$—CH$_2$CH(O)CH$_2$ | Cl$^-$ | 90 |

TABLE 3-continued

Mixture of $R_f-Q-OCONH-A-NHCOO-Q-R_f$ and $[R_f-Q-OCONH-A-NHCOX]_pZY$

| No. | $R_f$———$Q$— | —X— | A | p | —Z | Y | Amount of cationic fluorochemical in mixture, mole % |
|---|---|---|---|---|---|---|---|
| 5 | $C_8F_{17}-SO_2N(CH_3)C_4H_8-$ | O | $(CH_3)C_6H_3$ | 1 | $C_2H_4\overset{+}{N}(CH_3)C_2H_4$<br>$\vert$<br>$C_2H_5$ | $C_2H_5SO_4-$ | 90 |
| 6 | $C_8F_{17}-SO_2N(C_2H_5)C_2H_4-$ | NH | $CH_2C_6H_4CH_2$ | 1 | $C_3H_6\overset{+}{N}(CH_3)_2C_2H_5$ | $C_2H_5SO_4-$ | 23 |

Representative fluorochemical oxyalkylenes useful as component (b) in the fluorochemical blends of this invention are shown in Table 4. Generally, the preparation of the fluorochemical oxyalkylenes results in products which comprise mixtures of oxyalkylenes, the lengths of the fluoroaliphatic radical and the poly(oxyalkylene) moiety varying and the subscripts denoting the number of carbon atoms of the former and denoting the number of oxyalkylene units in a poly(oxyalkylene) segment being in both cases average numbers, and in this specification, e.g., Table 4, those subscripts should be understood as having such average values, unless otherwise indicated.

TABLE 4

1. $C_8F_{17}SO_2N(C_2H_5)CH_2CO_2(C_2H_4O)_{15}H$
2. $C_8F_{17}SO_2N(C_2H_5)C_2H_4O(C_2H_4O)_{14}H$
3. $C_8F_{17}C_2H_4O(C_2H_4O)_{15}H$

4. $C_8F_{17}SO_2N\begin{matrix}(C_2H_4O)_mH\\(C_2H_4O)_nH\end{matrix}$  (m + n = 25)

5. $C_8F_{17}SO_2N(C_2H_5)C_2H_4O(C_3H_6O)_8H$

6. $C_8F_{17}C_2H_4SCHCO_2(C_3H_6O)_mH$
   $\vert$
   $CH_2CO_2(C_3H_6O)_nH$   (m + n = 20)

7. $C_8F_{17}SO_2N(C_2H_5)C_2H_4O(C_2H_4O)_{7.5}H$

Representative fluorochemical oxyalkylene polyacrylates useful as component (b) in the blends of this invention are those made by copolymerizing any of the fluorochemical acrylates of Table 5 with any of the fluorine-free poly(oxyalkylene) monomers of Table 6.

TABLE 5

1. $C_8F_{17}SO_2N(CH_3)CH_2CH_2OCOCH=CH_2$
2. $C_6F_{13}C_2H_4OOCC(CH_3)=CH_2$
3. $C_6F_{13}C_2H_4SC_2H_4OCOCH=CH_2$
4. $C_8F_{17}C_2H_4OCOC(CH_3)=CH_2$
5. $C_8F_{17}C_2H_4N(CH_3)C_2H_4OCOC(CH_3)=CH_2$
6. $C_2F_5C_6F_{10}CH_2OCOCH=CH_2$
7. $C_7F_{15}CH_2OCOCH=CH_2$
8. $C_7F_{15}CON(CH_3)C_2H_4OCOCH=CH_2$
9. $(CF_3)_2CF(CF_2)_6CH_2CH(OH)CH_2OCOCH=CH_2$
10. $(CF_3)_2CFOC_2F_4C_2H_4OCOCH=CH_2$
11. $C_8F_{17}C_2H_4SO_2N(C_3H_7)C_2H_4OCOCH=CH_2$
12. $C_7F_{15}C_2H_4CONHC_4H_8OCOCH=CH_2$

13. $C_3F_7(CFCF_2O)_2CFCH_2OCOCH=CH_2$
    $\ \ \ \ \ \ \ \ \vert\ \ \ \ \ \ \ \ \ \ \ \vert$
    $\ \ \ \ \ \ \ \ CF_3\ \ \ \ \ \ CF_3$ 14. $C_7F_{15}COOCH_2C(CH_3)_2CH_2OCOC(CH_3)=CH_2$
15. $C_8F_{17}SO_2N(C_2H_5)C_4H_8OCOCH=CH_2$
16. $(C_3F_7)_2C_6H_3SO_2N(CH_3)C_2H_4OCOCH=CH_2$

TABLE 5-continued

17. $C_2F_5CF\begin{matrix}CF_2CF_2\\ \ \\ CF_2CF_2\end{matrix}NC_2F_4CON(CH_3)C_2H_4OCOCH=CH_2$ 18. $C_6F_{13}CF=CHCH_2N(CH_3)C_2H_4OCOCH=CH_2$
19. $C_8F_{17}SO_2N(C_4H_9)C_2H_4OCOCH=CH_2$
20. $C_8F_{17}SO_2N(C_2H_5)C_2H_4OCOCH(CH_3)=CH_2$

TABLE 6

1. $CH_2=CHCO_2(C_2H_4O)_{10}(C_3H_6O)_{22}(C_2H_4O)_9C_2H_4OCOCH=CH_2$
2. $CH_2=CHCO_2(C_2H_4O)_{17}CH_3$
3. $CH_2=C(CH_3)CONH(C_3H_6O)_{44}H$
4. $CH_2=C(CH_3)CO_2(C_2H_4O)_{90}COC(CH_3)=CH_2$
5. $HS(C_2H_4O)_{23}(C_3H_6O)_{35}(C_2H_4O)_{22}C_2H_4SH$

Other compatible optional comonomers, e.g., butyl acrylate, acrylonitrile, etc., which need not contain fluoroaliphatic radicals, can be copolymerized with the fluorochemical acrylate and oxyalkylene comonomers, in amounts up to about 25 weight percent, to improve compatibility or solubility of the fluorochemical oxyalkylene component (b) in the fiber finish.

Weight ratios of fluorochemical acrylate monomers (Table 5) and fluorochemical poly(oxyalkylene) monomers (Table 6) can vary but should be chosen along with said optional comonomers so that the carbon-bonded fluorine content of the resulting copolymer is in the desired range of 5 to 40 weight percent.

Objects and advantages of this invention are illustrated in the following examples which are not to be construed as limiting its scope.

EXAMPLE 1

This example describes the preparation of a cationic fluorochemical carbodiimide composition of this invention following the general synthetic steps shown in Scheme 1.

To a warmed (65°–70° C.), stirred solution of 187.5 g (0.75 mole) of methylenebis(4-phenyleneisocyanate) and 210 g of ethyl acetate in a 3-neck flask fitted with a mechanical stirrer, condenser, gas inlet tube, thermometer, addition funnel and electric heating mantle, was added a solution of 227 g (0.5 mole) of N-ethyl(perfluorooctane) sulfonamidoethyl alcohol, 9.3 g (0.104 mole) of dimethylaminoethanol and 120 g of ethyl acetate over a two hour period under a nitrogen amosphere. Stirring and heating at 75° C. were continued for an additional two hours until essentially all of the hydroxyl groups had been converted to urethane groups as indicated by IR absorption analysis.

To this stirred solution, containing fluorochemical urethane isocyanate, dimethylamino urethane isocyanate and unreacted diisocyanate, were added 3.8 g of camphene phenyl phosphine oxide ($C_{10}H_{16}POC_6H_5$), a carbodiimide-forming catalyst, and the reaction mixture was stirred and heated at about 75° C. for 10 hours, at which time essentially all of the isocyanate groups had been converted to carbodiimide groups as indicated by IR absorption analysis.

To this resulting fluorochemical urethane carbodiimide solution was added 15.4 g (0.10 mole) of diethyl sulfate and the reaction mixture was stirred and heated to 1½ hours at 65°–70° C. to complete the quaternization of approximately 95% of the tertiary amino groups as indicated by gas liquid chromatography analysis of unreacted diethyl sulfate. The product comprised mainly the mixed non-ionic and cationic fluorochemical carbodiimide represented by composition No. 4 in Table 1.

EXAMPLES 2–15

Following the general procedure of Example 1, except employing selected reactants from Table 8 and the specific reactants indicated in Table 9, the other cationic fluorochemical carbodiimides of Table 1 were prepared. The reagents in Table 8 are identified by symbols for later reference.

TABLE 8

Alcohols
- F1  $C_8F_{17}SO_2N(C_2H_5)CH_2CH_2OH$
- F2  $C_8F_{17}SO_2N(CH_3)(CH_2)_4OH$
- F3  $C_8F_{17}C_2H_4OH$
- H1  $C_8H_{17}OH$ Isocyanates MDI 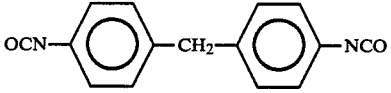

TDI 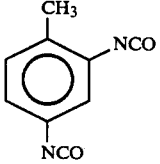

XDI 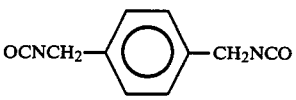

Amine Reagents
- A1  $(CH_3)_2NCH_2CH_2OH$
- A2  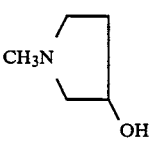
- A3  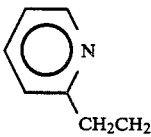

TABLE 8-continued

- A4  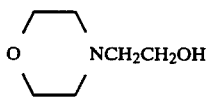
- A5  $(C_2H_5)_2NCH_2CH_2OH$
- A6  $(CH_3)_2NCH_2CH_2CH_2NH_2$
- A7  $CH_3N(CH_2CH_2OH)_2$ Quaternizing Agents
- Q1  $CH_2\!=\!CH_2CH_2Cl$
- Q2  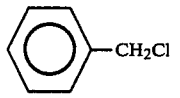
- Q3  $(CH_3)_2SO_4$
- Q4  $(C_2H_5)_2SO_4$
- Q5  
- Q6  $CH_3I$

TABLE 9

| Ex. No. | Fluorochemical No. (TABLE 1) | Alcohol | Isocyanate | Amine | Quaternizing Agent |
|---|---|---|---|---|---|
| 2 | 1 | F1 | MDI | A1 | Q1 |
| 3 | 2 | F1 | MDI | A1 | Q2 |
| 4 | 3 | F1 | MDI | A1 | Q3 |
| 5 | 5 | F1 | MDI | A2 | Q4 |
| 6 | 6 | F1 | MDI | A3 | Q4 |
| 7 | 7 | F1 | MDI | A4 | Q4 |
| 8 | 8 | F1 | MDI | A5 | Q4 |
| 9 | 9 | F1 | XDI | A1 | Q4 |
| 10 | 10 | F1 | TDI | A1 | Q4 |
| 11 | 11 | F1 | MDI | A1 | Q4 |
| 12 | 12 | F1 | MDI | A4 | 04 |
| 13 | 13 | F3 | TDI | A1 | Q4 |
| 14 | 14 | F1/H1 | XDI | A1 | Q4 |

*See Table 8 for reactant formulas.

EXAMPLE 15

This example describes the preparation of an aqueous microemulsion of the mixed non-ionic and cationic fluorochemical carbodiimide of this invention.

To 343 g (200 g of solids) of the product solution from Example 1 (containing composition 4, Table 1) was added 36 g of Triton X-102 nonionic surfactant and 200 g ethyl acetate. The resulting solution was warmed to 40° C. and 800 g of warm (40° C.) water was added while stirring rapidly. After the addition was complete, stirring was continued for an additional 10 minutes. The resulting semi-transparent microemulsion was further emulsified with a high shear homogenizer, and the ethyl acetate solvent removed from the emulsion to a concentration of less than 1% by distillation under water aspirator vacuum while heating at 35°–55° C.

EXAMPLE 16

This example describes the preparation of mixed non-ionic and cationic fluorochemical urylenes and microemulsion according to Scheme 2.

A portion of the microemulsion from Example 15, containing the mixed non-ionic and cationic fluorochemical carbodiimide No. 4 of Table 1, was heated at 80° C. for 14 hours while gently stirring. This resulted in essentially complete conversion of the carbodiimide groups to urylene groups as determined by IR analysis, thus yielding a microemulsion containing the mixed non-ionic and cationic fluorochemical urylene No. 1 in Table 2.

EXAMPLES 17-20

Following the general procedure of Examples 15 and 16, the other fluorochemical urylenes of Table 2 were prepared as indicated in Table 10.

TABLE 10

| Ex. No. | Starting Compos: FC carbodiimide No. (Table 1) | Product: FC urylene composition No. (Table 2) |
|---|---|---|
| 17 | 12 | 2 |
| 18 | 10 | 3 |
| 19 | (10)$^a$ | 4 |
| 20 | 14 | 6 |

$^a$same as composition 10 (Table 1), except n = 2

EXAMPLES 21-26

This example describes the preparation of a mixed non-ionic and cationic fluorochemical urethane ("carbonylimino compound") composition of this invention.

Following the general procedure of Example 1 except that equivalent amounts of alcohol and isocyanate reactants were used (i.e., no excess isocyanate), and no carbodiimidization step was employed, the mixed non-ionic and cationic fluorochemical urethanes of Tables 3 and 4 were prepared. The reactants used are shown in Table 11.

TABLE 11

| Ex. No. | Fluorochemical Composition No. (Table 3) | REACTANTS* | | | |
|---|---|---|---|---|---|
| | | Alcohol | Isocya-nate | Amine | Quater-nizing Agent |
| 21 | 1 | F1 | XDI | A1 | Q4 |
| 22 | 2 | F1 | MDI | A1 | Q4 |
| 23 | 3 | F1 | TDI | A1 | Q4 |
| 24 | 4 | F2 | TDI | A7 | Q5 |
| 25 | 5 | F1 | TDI | A7 | Q4 |
| 26 | 6 | F1 | XDI | A6 | Q4 |

*See Table 8 for reactant formulas.

EXAMPLE 27

This example describes the preparation of a non-ionic fluorochemical urylene of this invention.

Following the general procedure of Example 1, and using the same reactants and molar ratios, except omitting the dimethylaminoethanol and the quaternization steps, a fluorochemical carbodiimide intermediate was prepared. This was converted to an aqueous emulsion and hydrolyzed following the procedure of Examples 15 and 16, to yield a non-ionic fluorochemical urylene having the formula R$_f$QA(NHCONHA)$_n$QR$_f$ where R$_f$Q is C$_8$F$_{17}$SO$_2$N(C$_2$H$_5$)C$_2$H$_4$OCONH, A is C$_6$H$_4$CH$_2$C$_6$H$_4$ and n is 2, as an aqueous microemulsion.

EXAMPLES 28-43

In these examples, several of the fluorochemicals of this invention, specified in Table 12, were used in the form of aqueous emulsions, in the presence of a non-ionic texile fiber lubricant, and generally in combination with a nonionic surfactant, to treat samples of scoured nylon 66 greige carpet (28 oz/yd$^2$) in a padding application (71% wet pickup).

The fluorochemical treated carpet samples were placed on a paper blotter to remove excess emulsion, then dried in a circulating air oven (25 minutes at 70° C. and 5 minutes at 150° C.).

The fluorochemical treated, dried samples were then acid dyed, excess aqueous dye solution removed, samples rinsed and dried at 70° C. and then heated for 5 minutes at 130° C.

The fluorochemical treated carpet samples were analyzed for fluorine before and after dyeing to measure retention of fluorochemical on the carpet fibers. The fluorochemical treated, dyed samples were evaluated for oil repellency (OR), water repellency (WR) and wallk-on soil resistance (WOS). The results are summarized in Table 12.

The water repellency test is one which is often used for this purpose. The aqueous stain or water repellency of treated samples is measured using a water/isopropyl alcohol test, and is expressed in terms of a water repellency rating of the treated carpet or fabric. Treated carpets which are penetrated by or resistant only to a 100 percent water/0 percent isopropyl alcohol mixture (the least penetrating of the test mixtures) are given a rating of 0, whereas treated fabrics resistant to a 0 percent water/100 percent isopropyl alcohol mixture (the most penetrating of the test mixtures) are given a rating of 10. Other intermediate rating values between 0 and 10 are determined by use of other water/isopropyl alcohol mixtures, in which the percentage amounts of water and isopropyl alcohol are each multiples of 10. The water repellency rating corresponds to the most penetrating mixture which does not penetrate or wet the fabric after 10 seconds contact. In general, a water repellency rating of 1 or better, e.g., 2, is desirable for carpet.

The oil repellency test is also one which is often used for this purpose. The oil repellency of treated carpet and textile samples is measured by AATCC Standard Test 118-1978, which test is based on the resistance of treated fabric to penetration by oils of varying surface tensions. Treated fabrics resistant only to "Nujol", a brand of mineral oil and the least penetrating of the test oils, are given a rating of 1, whereas treated fabrics resistant to heptane (the most penetrating of the test oils) are given a value of 8. Other intermediate values are determined by use of other pure oils or mixtures of oils. The rated oil repellency corresponds to the most penetrating oil (or mixture of oils) which does not penetrate or wet the fabric after 10 seconds contact, rather than the 30 seconds contact of the Standard Test. Higher numbers indicate better oil repellency. In general, an oil repellency of 2 or greater is desirable for carpet.

The soil resistance of treated and untreated (control) carpet was determined by exposure to pedestrian traffic according to AATCD Test method 122-1979, the exposure site being a heavily travelled industrial area for an exposure of about 15,000 "traffics". The samples are repositioned periodically to insure uniform exposure and are vacuumed every 24 hours during the test and before visual evaluation. The evaluation employed the following "Walk-On-Soiling" (WOS) rating system:

| WOS Rating | Description |
| --- | --- |
| 0 | equal to control |
| ±½ | slightly bettter (+) or worse (−) than control |
| ±1 | impressive difference compared to control |
| ±1½ | very impressive difference compared to control |
| ±2 | extremely impressive difference compared to control |

In the tables which follow, the surfactant used is identified according to the following code:

| Code | Surfactant |
| --- | --- |
| A | "Triton" X-102 |
| B | "Tween" 80 |
| C | "Igepal" C0990 |
| D | fluorochemical poly(oxyalkylene), copolymer of $C_8F_{17}SO_2N(CH_3)CH_2CH_2OCOCH=CH_2$, $CH_2=CHCOO(C_2H_4O)_{10}(C_3H_6O)_{22}(C_2H_4O)_9C_2H_4OH$, and $CH_2=CHCOO(C_2H_4O)_{10}(C_3H_6O)_{22}(C_2H_4O)_9C_2H_4OCOCH=CH_2$ | oxyalkylene or a hydrocarbon non-ionic surfactant, as indicated in Table 13.

The fluorochemical spin finish emulsion composition adjusted to 0.2% fluorochemical (based on F content) was applied to a metered slot applicator to melt extruded, undrawn yarn of nylon 66. The yarn was made of 110 filaments of 20 denier (per filament). The treated yarn was continuously drawn and texturized and made into level-loop carpet (28 oz./yd$^2$), heat set at 190° C. for one minute, acid dyed, dried at 70° C. for 30 min., heated at 130° C. for 10 min., and then evaluated for oil and water repellency, walk-on soil resistance, and reten-

TABLE 12

| | Fluorochemical composition | | | | Properties of treated carpet | | | |
| --- | --- | --- | --- | --- | --- | --- | --- | --- |
| | Fluorochemical identity | | Aqueous emulsion properties | | % Fluorochemical retention | | | |
| | | | Surfactant | | % Fluorochemical | | | |
| Ex. No. | Table | No. | Code | %$^a$ | solids$^b$ | through dyeing$^c$ | OR | WR | WOS |
| 28 | 1 | 4 | none | — | 32 | 59 | 4 | 3 | +¾ |
| 29 | 1 | 3 | none | — | 31 | 56 | 5 | 3 | +1 |
| 30 | 1 | 6 | none | — | 26 | 79 | 5 | 2 | +¾ |
| 31 | 1 | 8 | A | 13 | 31 | 96 | 4 | 8 | +1 |
| 32 | 1 | 12 | A | 13 | 20 | 74 | 3 | 6 | +¾ |
| 33 | 1 | 13 | A | 18 | 22 | 90 | 4 | 3 | +1½ |
| 34 | 3 | 6 | A | 18 | 22 | 76 | 5 | 2 | +1½ |
| 35 | 3 | 6 | D | 35 | 23 | 32 | 5 | 1 | +1½ |
| 36 | 2 | 1 | A | 18 | 24 | 46 | 4 | 7 | +1½ |
| 37 | 2 | 3 | A | 15 | 20 | 77 | 4 | 6 | +2 |
| 38 | 2 | 5 | A | 18 | 22 | 90 | 4 | 3 | +1¾ |
| 39 | * | | B,C | 17,3 | 22 | 60 | 3 | 6 | +1¾ |
| 40 | * | | D | | 20 | 67 | 4 | 8 | +1¾ |
| 41 | 3 | 1 | A | 15 | 21 | 88 | 3 | 2 | +1½ |
| 42 | 4 | 2 | | | 21 | 60 | 3 | 3 | — |
| 43 | Control | | — | — | — | — | 0 | NWR$^d$ | 0 |

*Example 27
$^a$Percent with respect to the fluorochemical of this invention (Tables 1–4).
$^b$Percent of fluorochemical (i.e., Tables 1–3) in emulsion.
$^c$A theoretical 600 ppm F deposited on carpet fibers by adjustment of fluorochemical concentration in the emulsion.
$^d$NWR means No Water Resistance The data of Table 12 shows that the mixed non-ionic and cationic fluorochemicals of this invention, Examples 27–41, imparted useful oil and water repellency and soil resistance to the nylon 66 carpet fiber and the fluorochemical was retained through dyeing.

EXAMPLES 44–46

These examples describe the treatment of nylon carpet fiber with 0.2% (based on %F) aqueous emulsions of a cationic fluorochemical urylene of composition No. 1 of Table 2, in combination with a 3.5 wt.% aqueous emulsion of a fiber spin finish, and a fluorochemical tion of fluorochemical through the dyeing process as determined by fluorine analysis. The testing results are shown in Table 13.

TABLE 13

| | Surfactant used with fluorochemical | | Amount of fluorine on carpet in ppm | | % fluorine retention | | | |
| --- | --- | --- | --- | --- | --- | --- | --- | --- |
| Example No. | Code | % | before dyeing | after dyeing | through dyeing | OR | WR | WOS |
| 44 | A | 18 | 500 | 386 | 77 | 4 | 6 | +2 |
| 45 | D | 17.5 | 530 | 364 | 69 | 5 | 8 | +2¼ |
| 46 | none | — | 0 | 0 | — | 0 | NWR | |

The data of Table 13 shows that the mixed non-ionic and cationic fluorochemical urylene of this invention imparts excellent oil and water repellency and soil resistence when applied to nylon carpet fiber from a spin finish emulsion and that the fluorochemical was retained through dyeing.

EXAMPLES 47-52

In these examples, two different rainwear fabrics were treated with an aqueous emulsion of a mixed non-ionic and cationic fluorochemical urylene of composition No. 1 of Table 2, in combination with a fluorochemical oxyalkylene or a hydrocarbon non-ionic surfactant, as indicated in Table 14. The fabrics were treated in a padding operation, dried at 150° C. for 10 min., and evaluated for initial oil repellency (OR) and resistance to a water spray (SR), then these properties evaluated again after 5 launderings (5L) and also after one dry cleaning (DC).

The OR test used was the above-described AATCC Standard Test 118-1978, the contact time before observation being the specified 30 sec., an OR value of 3 or greater being particularly desirable for rainwear fabrics.

The water spray rating (SR) is measured by AATCC Test Method 22-1979. The spray rating is measured using a 0 to 100 scale where 100 is the highest possible rating. In general, a spray rating of 70 or greater is desirable, particularly for outerwear fabrics.

The treated fabrics were laundered using a mechanically agitated automatic washing machine capable of containing a 4 kg load, using water at 50° C. and a commercial detergent, and then the washed fabrics were tumble-dried in an automatic dryer for 40 minutes at 70° C. and pressed in a flat-bed press (at 154° C.) before testing.

The treated fabrics were dry cleaned using perchloroethylene containing 1% of a dry cleaning detergent and tumbling in a motor driven tumble jar (AATCC Test Method 70-1975) for 20 minutes at 25° C. After removing excess solvent in a wringer, samples were dried at 70° C. for 10 minutes, then pressed on each side for 15 seconds on a flat-bed press maintained at 154° C.

The test data were summarized in Table 14.

TABLE 14

| Example No. | Surfactant used with fluorochemical Code | % | % SOF[a] | Fabric[b] | Initial OR | Initial SR | 5L OR | 5L SR | DC OR | DC SR |
|---|---|---|---|---|---|---|---|---|---|---|
| 47 | A | 18 | 0.2 | A | 5 | 85 | 1 | 75 | 1 | 50 |
| 48 | A | 18 | 0.2 | B | 4 | 80 | 2.5 | 70 | 2 | 70 |
| 49 | D | 17.5 | 0.2 | A | 6 | 80 | 2 | 75 | 2 | 80 |
| 50 | D | 17.5 | 0.2 | B | 5.5 | 70 | 4 | 70 | 2.5 | 70 |
| 51 | None | — | 0 | A | 0 | 0 | 0 | 0 | 0 | 0 |
| 52 | None | — | 0 | B | 0 | 0 | 0 | 0 | 0 | 0 |

[a] Percent fluorochemical solids on fabric
[b] Fabric A is 100% woven polyester; fabric B is 100% nylon taffeta.

The data of Table 14 show useful oil and water repellency was obtained for the rainwear fabric, although laundering and dry cleaning decreased the oil repellency.

EXAMPLES 53-58

In these examples, two different upholstery fabrics were treated with an aqueous emulsion of a cationic fluorochemical urylene of composition No. 1 of Table 2, in combination with a fluorochemical oxyalkylene or a hydrocarbon nonionic surfactant, as indicated in Table 15.

The fabrics were treated in a padding operation, dried at 150° C. for 10 min., and evaluated for initial oil repellency (OR) and resistance to a water spray (SR) using the test procedures described above. The oil repellency of tested fabrics after abrasion is measured by abrading 5 cm × 12.5 cm samples of fabric (the long dimension is the warp direction) using 40 back-and-forth rubs over a 20 second period with No. 600 abrasive paper ("WETORDRY TRI-M-ITE", commercially available from 3M Co.) in a AATCC crockmeter. The above described AATCC oil repellency Test 118-1978 is performed on the abraded samples and the oil repellency rating recorded. In general, an oil repellency after abrasion of 3 or greater is desirable.

The test data are summarized in Table 15.

TABLE 15

| Example No. | Surfactant used with fluorochemical Code | % | % SOF | Fabric[a] | Initial OR | Abraded OR | SR |
|---|---|---|---|---|---|---|---|
| 53 | A | 18 | 0.3 | C | 2 | 1 | 70 |
| 54 | A | 18 | 0.3 | D | 3 | 1 | 80 |
| 55 | D | 17.5 | 0.3 | C | 4 | 1 | 80 |
| 56 | D | 17.5 | 0.3 | D | 1.5 | 1 | 80 |
| 57 | None | — | 0 | C | 0 | 0 | 0 |
| 58 | None | — | 0 | D | 0 | 0 | 0 |

[a] Fabric C is 100% rayon velvet; fabric D is 79/21 rayon/cotton velvet.

The data of Table 15 show that the mixed non-ionic and cationic fluorochemical of the invention provides useful oil and water repellency to the upholstery fabrics, although abrasion decreased the oil repellency.

EXAMPLES 59-65

In these examples, water-leaf paper sheets were treated with an aqueous emulsion of a cationic fluorochemical urylene of composition No. 1 of Table 2, in combination with a fluorochemical oxyalkylene or a hydrocarbon nonionic surfactant, as indicated in Table 16.

The paper sheets were treated with various concentration of the fluorochemical emulsion compositions using a laboratory size press (yielding a 93% wet pickup) and the sheets dried in a photo sheet dryer at 150° C. and evaluated for oil and water repellency. The results are given in Table 16.

TABLE 16

| Example No. | Surfactant used with fluorochemical Code | % | Concentration of fluorochemical in bath, wt. % | Amount of fluorochemical on paper, wt. % | Oil repellency[a] | Water repellency[b] |
|---|---|---|---|---|---|---|
| 59 | A | 18 | 1.35 | 0.3 | 7 | 30 |
| 60 | A | 18 | 2.25 | 0.5 | 7 | 26 |
| 61 | A | 18 | 4.50 | 1.0 | 7 | 19 |
| 62 | D | 17.5 | 1.49 | 0.3 | 8 | 23 |

TABLE 16-continued

| Example No. | Surfactant used with fluorochemical Code | % | Concentration of fluorochemical in bath, wt. % | Amount of fluorochemical on paper, wt. % | Oil repellency[a] | Water repellency[b] |
|---|---|---|---|---|---|---|
| 63 | D | 17.5 | 2.49 | 0.5 | 10+ | 23 |
| 64 | D | 17.5 | 4.98 | 1.0 | 10+ | 19 |
| 65 | None | — | 0 | 0 | 0 | NWR |

[a]This was determined by the "Kit Test" described as TAPPI Useful Method 557; the higher the value the better the repellency.
[b]This was determined by the "Cobb Test" described as TAPPI-T441-OS-77; the lower the value, the better the water repellency.

The data of Table 16 show that the mixed non-ionic and cationic fluorochemicals of the invention impart useful oil and water repellency to paper.

EXAMPLES 66–67

In example 66, a gold-colored, plush, cut-pile, pre-wet nylon carpet (50 oz/yd$^2$) was treated by top spray application (15% wet pickup) of a diluted mixture of an aqueous emulsion of the mixed non-ionic and cationic fluorochemical urylene of composition No. 1 of Table 2 and an aqueous emulsion of a fluorochemical oxyalkylene or a hydrocarbon nonionic surfactant, the dilution (with water) of the mixture of emulsions being done to obtain the desired concentration of fluorochemical necessary to deposit the amount (SOF) of fluorochemical on the carpet specified in Table 17. The treated carpet sample was dried for 30 minutes at 70° C. and heated further at 130° C. for 10 min. and then evaluated for OR, WR and WOS. Comparative example 67 was not treated with fluorochemicals. The results are summarized in Table 17.

TABLE 17

| Example No. | Surfactant used with fluorochemical Code | % | % SOF[a] | OR | WR | WOS[d] |
|---|---|---|---|---|---|---|
| 66 | A | 18 | 0.2 | 1 | 2 | +1½ |
| 67 | — | — | — | NOR[b] | NWR[c] | 0 |

[a]% fluorochemical solids on fabric.
[b]No oil resistance
[c]No water resistance.
[d]Walk-on soil value with respect to untreated carpet which has a value of 0.

The data of Table 17 show that a mixed non-ionic and cationic fluorochemical urylene of the invention imparts useful oil and water repellency and soil resistance to nylon carpet when applied using top spray treatment.

EXAMPLE 67

A sample of chrome-tanned, dyed, fat liquored leather was treated with 0.67 wt. percent of an aqueous dispersion of a cationic fluorochemical urylene of composition No. 1 of Table 2, containing 17.5% of surfactant "D" as emulsifier (with respect to the fluorochemical urylene), in a drumming operation. The amount of fluorochemical deposited on leather was 2 wt. percent. The treated leather was dried in air. The grain and suede sides of the treated leather were found to have oil repellency values of 2 on both sides and water repellency values of 3 on both sides. (The untreated chrome-tanned, dyed leather has essentially no oil or water repellency.)

Various modifications and alterations of this invention will become apparent to those skilled in the art without departing from the scope of this invention.

What is claimed is:

1. A fluorochemical composition comprising a mixture of (a) a cationic fluorochemical having one or more monovalent fluoroaliphatic radicals having at least three fully fluorinated carbon atoms, one or more N-containing moieties selected from carbodiimido, urylene, and carbonylimino, said radicals and moieties being bonded together by hetero atom-containing or organic linking groups, said linking groups being free of active hydrogen atoms, and an organo amino nitrogen derived cationic moiety, said cationic moiety bonded to said N-containing moiety by hetero atom-containing or organic linking groups, and (b) a non-ionic fluorochemical having one or more monovalent fluoroaliphatic radicals, having at least three fully fluorinated carbon atoms, and one or more N-containing moieties selected from carbodiimido, urylene, and carbonylimino, said radicals and moieties bonded together by hetero atom-containing or organic linking groups, said linking groups being free of active hydrogen atoms.

2. A fluorochemical composition according to claim 1 wherein said cationic fluorochemical (a) is represented by the general formula

[R—Q—A(BA)$_n$Q$_z$]$_p$ZY and said non-ionic fluorochemical (b) is represented by the general formula R—Q—A(BA)$_n$Q—R where each R is independently selected from hydrogen and terminal monovalent organic radicals, each Q is independently a divalent hetero atom-containing group or organic linking group, each A is independently a divalent organic linking group, with the proviso that at least one R or A in each of (a) and (b) contain said fluoroaliphatic radical, B is a carbodiimido, urylene, or carbonylimino group, Z is an organo amine nitrogen-derived cationic moiety, Y is an anionic species, n is 1 to 20, z is zero or 1, and p is 1 to 3.

3. A fluorochemical composition according to claim 2 wherein said terminal monovalent organic radicals are selected from alkyl, cycloalkyl, aryl radicals and combinations thereof, which are free of active hydrogen atoms that can readily react with isocyanate under urethane bond forming conditions.

4. A fluorochemical composition according to claim 2 wherein said terminal monovalent organic radicals contain hetero moieties selected from O, S, N, Si, and CO.

5. A fluorochemical composition according to claim 2 wherein R—Q is C$_8$F$_{17}$SO$_2$N(C$_2$H$_5$)C$_2$H$_4$CONH—, A is selected from —C$_6$H$_4$CH$_2$C$_6$H$_4$—, —(CH$_3$)C$_6$H$_3$—, and —CH$_2$C$_6$H$_4$CH$_2$—, B is selected from —N=C=N—, —NHCONH—, —OCONH, and —SCONH—, Q—Z is selected from NHCOOC$_2$H$_4$N$^+$(CH$_3$)$_2$C$_2$H$_5$ and NHCOOC$_2$H$_4$N$^+$(CH$_3$)$_3$, Y is selected from CH$_3$SO$_4^-$, C$_2$H$_5$SO$_4^-$, and I$^-$, n is 1 to 5 and p is 1.

6. A fluorochemical composition comprising a blend of the composition of claim 2 and a fluoroaliphatic radical-containing poly(oxyalkylene) having one or more monovalent fluoroaliphatic radicals having at least three fully fluorinated carbon atoms and one or more poly(oxyalkylene) moieties, said radicals and moieties bonded together by hetero atom-containing groups or organic linking groups.

7. A fluorochemical composition according to claim 6 wherein said polyoxyalkylene is a copolymer of C$_8$H$_{17}$SO$_2$N(CH$_3$)CH$_2$CH$_2$OCOCH=CH$_2$, CH$_2$=C(CH$_3$)CO$_2$(C$_2$H$_4$O)$_{90}$H, and CH$_2$=C(CH$_3$)CO$_2$(C$_2$H$_4$O)$_{90}$COC(CH$_3$)=CH$_2$.

8. A fluorochemical composition comprising a blend of the fluorochemical composition of claim 2 and a hydrocarbon nonionic surfactant.

9. A fluorochemical composition according to claim 6 further comprising a hydrocarbon nonionic surfactant.

10. The fluorochemical composition according to claim 8, wherein said hydrocarbon nonionic surfactant has a hydrophile/lipophile balance of 13 to 16.

11. A fluorochemical composition according to claim 10 wherein said hydrocarbon nonionic surfactant is selected from alkarylpoly(oxyethylene) and poly(oxyethylene)sorbitan monoaleate.

12. A fiber finish comprising an organic solution or aqueous microemulsion of the fluorochemical composition of claim 6 or 7.

13. A method for imparting oil and water repellency to a fibrous substrate, which comprises treating the surface thereof with the composition of claim 1.

14. A fibrous substrate treated with the fluorochemical composition of claim 1.

15. A fluorochemical composition comprising a mixture of
(a) a cationic fluorochemical having one or more monovalent fluoroaliphatic radicals, said fluoroaliphatic radicals having at least three fully fluorinated carbon atoms and being stable, inert, nonpolar, and both oleophobic and hydrophobic, one or more N-containing moieties selected from carbodiimido, urylene, and carbonylimino, said radicals and moieties being bonded together by linking groups selected from polyvalent aliphatic, polyvalent aromatic, oxy, thio, carbonyl, sulfone, sulfoxy, —N(CH$_3$)—, sulfonamido, carbonamido, sulfonamidoalkylene, carbonamidoalkylene, carbonyloxy, urethane, urea, and combinations thereof, said linking groups being free of isocyanate-reactive hydrogen atoms, and an organo amino nitrogen derived cation moiety, said cationic moiety bonded to said N-containing moiety by said linking groups, and
(b) a non-ionic fluorochemical having one or more monovalent fluoroaliphatic radicals, having at least three fully fluorinated carbon atoms, and one or more N-containing moieties selected from carbodiimido, urylene, and carbonylimino, said radicals and moieties bonded together by linking groups selected from polyvalent aliphatic, polyvalent aromatic, oxy, thio, carbonyl, sulfone, sulfoxy, —N(CH$_3$)—, sulfonamido, carbonamido, sulfonamidoalkylene, carbonamidoalkylene, carbonyloxy, urethane, urea, and combinations thereof, said linking groups being free of isocyanate-reactive hydrogen atoms.

* * * * *

UNITED STATES PATENT AND TRADEMARK OFFICE
CERTIFICATE OF CORRECTION

PATENT NO. : 4,566,981
DATED : January 28, 1986
INVENTOR(S) : RICHARD D. HOWELLS It is certified that error appears in the above-identified patent and that said Letters Patent is hereby corrected as shown below:

Col. 29, line 32, Claim 12, "7" should read --10--.

Col. 5, lines 43-44, "$-(C_2H_4O)_yC_2H_4)-$" should read -- $-(C_2H_4O)_yC_2H_4-$ --.

Col. 6, line 36, insert --and $-C_2H_4N+(CH_3)_2H$.--

Col. 11, line 19, "foams" should read --forms--.

Col. 21, line 67, "texile" should read --textile--.

Signed and Sealed this

Fifth Day of August 1986

[SEAL]

Attest:

DONALD J. QUIGG

Attesting Officer

Commissioner of Patents and Trademarks